April 15, 1958     K. H. MUNTZ     2,830,319
METHOD OF EVISCERATING FOWL
Filed Oct. 1, 1956     3 Sheets-Sheet 2
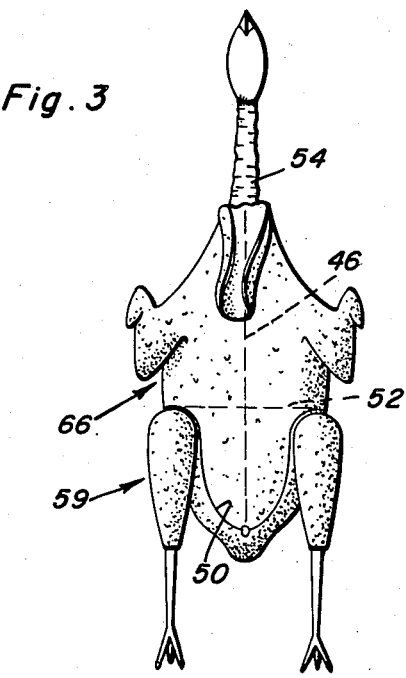
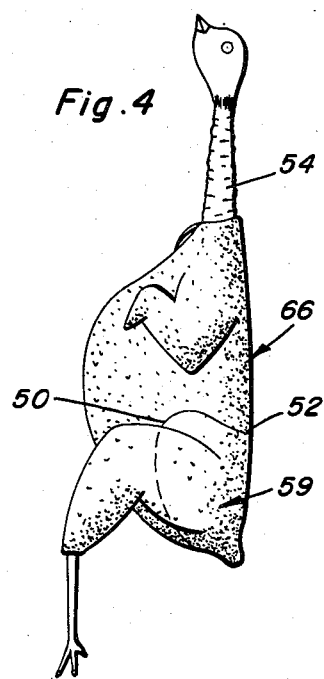
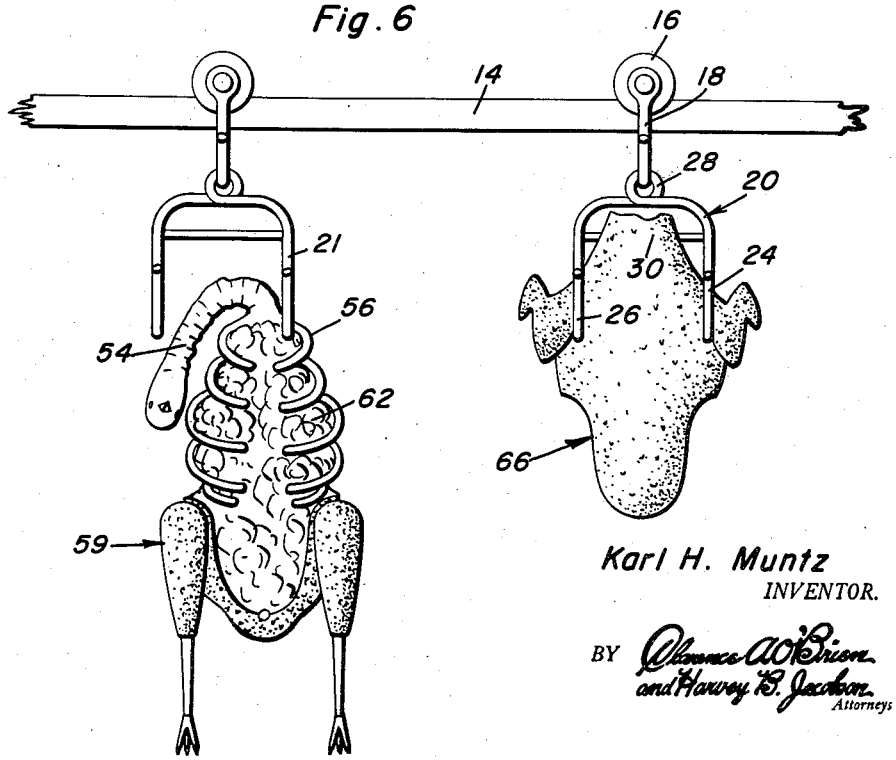
Karl H. Muntz
INVENTOR.

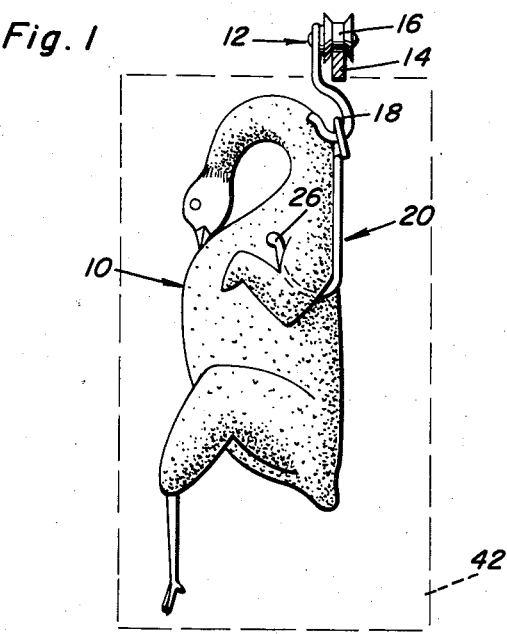
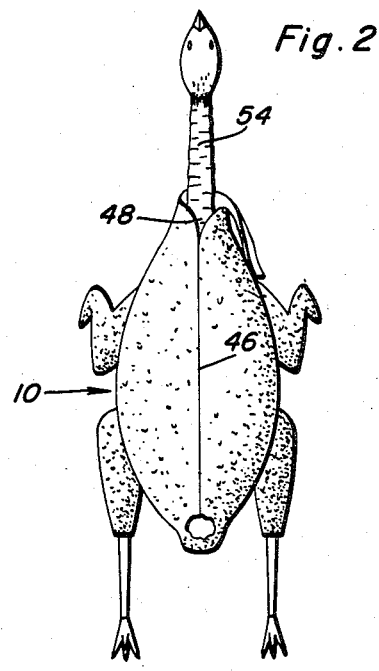
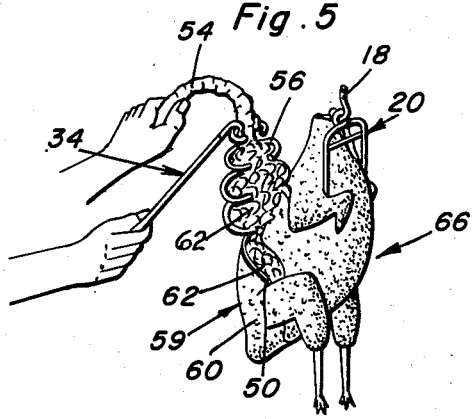
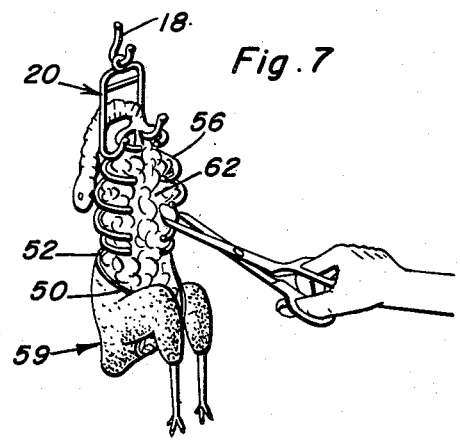
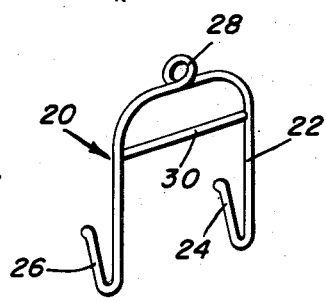

April 15, 1958      K. H. MUNTZ      2,830,319
METHOD OF EVISCERATING FOWL
Filed Oct. 1, 1956      3 Sheets-Sheet 3
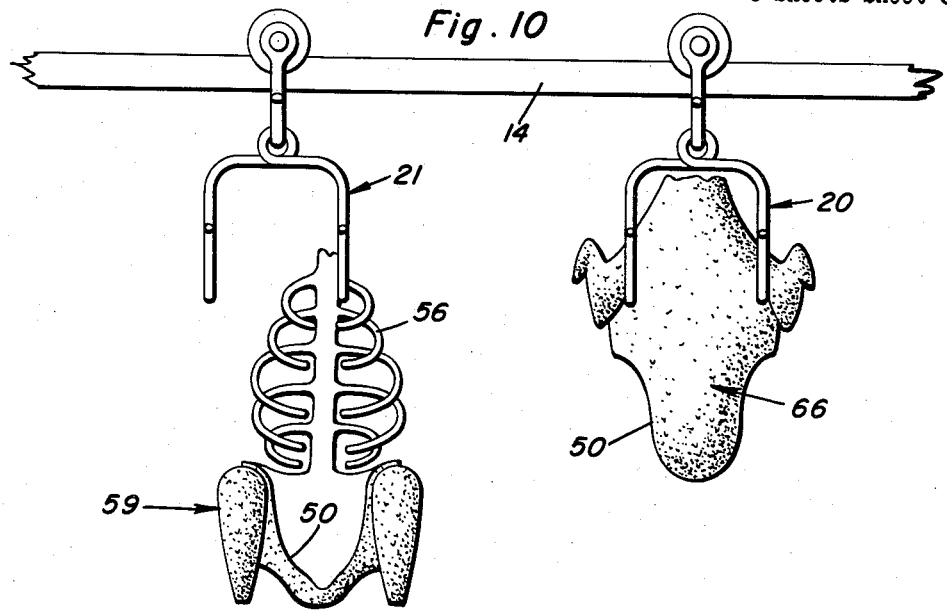
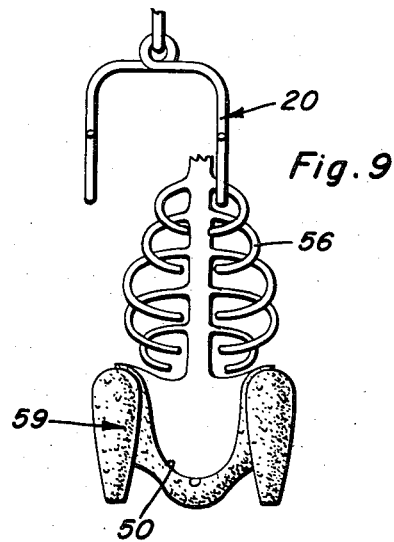
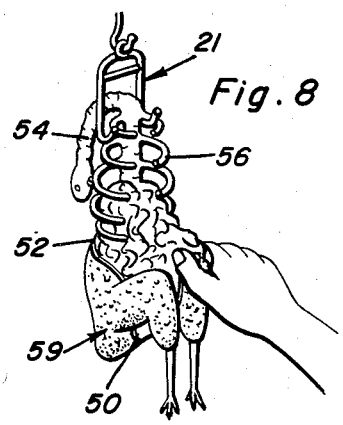
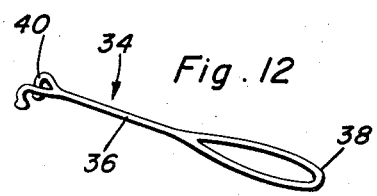
Karl H. Muntz
INVENTOR.

United States Patent Office 2,830,319
Patented Apr. 15, 1958

2,830,319

METHOD OF EVISCERATING FOWL

Karl H. Muntz, Clinton, Iowa

Application October 1, 1956, Serial No. 613,209

11 Claims. (Cl. 17—45)

This invention relates to poultry evisceration and more particularly to a method for eviscerating fowl and separating it into white and dark meat portions.

Fowl, for example poultry, is processed after being eviscerated. The processing starts with poultry that has been killed and plucked, commonly referred to as New York dressed. An object of this invention is to provide a cleaner and more efficient method of eviscerating poultry and separating it into white and dark meat portions and removing the undesirable neck and rib bones, the method employing a complete separation of the white and dark meat since this is accomplished by actual muscle separation and bone disarticulation through tension and pressures rather than by other forms of cleavage, as cutting.

A more particular object of the invention is to teach a method for processing poultry wherein the poultry carcass is completely eviscerated and at the same time separated into two sections, the first section or portion containing all of the white meat while the second section contains all of the dark meat which will have the rib and neck bones attached whereby they may be removed inasmuch as they contain so little meat (rib and neck bones) that they can be used profitably only as soup stock.

Since the rib and neck bones and the small quantity of meat thereon are the most undesirable part of the carcass and are easily removed there remains approximately 95% of the carcass as the previously referred to sections having respectively white and dark meat devoid of the rib and neck bones. The white meat section will contain all of the breast muscles from the keel bone around to the center of the backbone and this will include the white meat which lays over the ribs, this meat usually being associated with the rib section of the carcass. Accordingly, this part of the white meat which ordinarily would be considered less choice, is retained with the breast so as to actually be a more choice and expensive part of the carcass. This materially increases the proportion of the desirable breast meat of the poultry. The other section will include the dark meat that is, legs, thighs and back.

A further object of the invention is to eviscerate and section poultry utilizing actual muscle separation and bone disarticulation through tension or other forces but making very shallow cuts through the skin only of the poultry meat and a definite pattern so that the skin covering of the poultry meat will cover the meat well without tears or taps.

With the rib and neck bones removed from the carcass the two choice sections are more easily suited to further separation into smaller choice parts than by present eviscerating and sectioning techniques. The second or white meat section can be split in half at the keel bone and thereby become two quartered pieces that include respectively half the breast and one wing. Such a piece is ideally utilized in restaurants, hotels, and other public eating places and is especially useful for barbecuing, deep fat frying or roasting in quarters. These quartered sections can further be divided into wings and breasts for so called parts packs.

The dark meat section which contains the back and both legs and thighs can be made into two quarters by splitting down the backbone. These quarters are ideally useful the same as the white section and moreover, the quarters may be further separated into parts consisting of thighs, legs and backs by disjointing.

A further object of the present invention is to provide a method for eviscerating and processing poultry wherein boned meat is desired. The small rib and neck bones in poultry become a real problem in present boning techniques. Inasmuch as the process of the invention removes the small rib and neck bones before the carcass is boned, the chance of small bones in the finished product is drastically reduced and this is a labor saver in commercially boning poultry, for example for canning.

Another object of the invention is to provide a process for eviscerating and processing poultry wherein the steps are carried out in a most sanitary manner, this being inherent in the actual steps that are involved. The process contemplates the forming of certain cuts through the skin only of the poultry and the separation of the meat into white and dark meat sections with the viscera adhering to its natural backbone support and then subsequently removed after the viscera together with the remainder of the first or dark meat section is completely isolated and separated from the other choice section that is, the white meat section. There is absolutely no chance of the viscera being broken or being cut with an instrument since the viscera separates from the chest cavity and breast portion by natural separation through tension. It remains suspended from the natural supporting membranes at the backbone in the dark meat section and then they are removed wholly without tearing. Inasmuch as the light meat section is completely removed from the viscera there is no way for the viscera to contaminate the white meat section. Moreover another aspect of the improved sanitation condition is that the view of the viscera is better exposed and in natural position for inspection of all viscera and organs for wholesomeness. This alone facilitates better and more rapid inspection and thereby increases the speed of the operating line which is a great factor in economical preparation.

In present eviscerating plants there must be an eviscerating inspection table to catch the viscera for inspection. A further object of the invention is to provide a process which will make an eviscerating inspection table dispensable and wholly unnecessary and thereby contributing to savings in labor and equipment. The elimination of this table is made possible by the suspension of the viscera in its natural form and position from the backbone of the poultry before, during and after inspection. It follows that certain operators may be eliminated. In most instances the lungs need not be removed since the rib bones hold the lungs and so little meat is on the ribs that they and the lungs may be discarded. In ordinary eviscerating plants the carcass is many times turned manually in a shackle, and this is not necessary in that the process or method contemplates the full operation with the carcass remaining suspended by the wings. Such functions as requiring manual operators at the present time, for example inside washer, turner, puller, lung remover are no longer necessary.

Although automatic washing of poultry has been proposed in the past, this is not practical unless all of the parts of the carcass are exposed and can actually be reached by automatic water sprays. Accordingly, even with the so called automatic washing of the finished carcass, there has been need for supplementary manual washing. By eviscerating and processing the poultry as described herein truly automatic washer sprays may be used because the finished carcass has all of its parts exposed so that they can be effectively reached by water sprays.

As used herein the expressions "fowl" and "poultry" are considered to be synonymous. In fact, the principal classes of poultry on which the invention is to be practiced are broiler and fryer chickens, primarily of the cutup, quarters, parts etc. Practically all broilers and fryers are ultimately consumed by the piece. Fowl of the cutup type for tray pack, quarters, fricassee or boning is another class of poultry. Third, there are turkeys for quartering or boning and finally, there is the group of poultry, as ducks, geese and other fowl which is not at the present time in this country as high in volume as the more common turkey and chickens.

Other objects will become apparent in considering the description of the processes specifically described with the aid of the accompanying drawings, wherein:

Fig. 1 is a side view of a chicken constituting the fowl that is to be described in detail, Fig. 1 having the fowl in a schematically represented singer and suspended by a shackle on an overhead rail;

Fig. 2 is a dorsal view of the fowl in Fig. 1, this view showing an initial cut along a median line on the dorsal of the fowl that has been formed just below the head down to the tail and this view showing the neck skin, esophogus and trachea peeled down to the crop cavity;

Fig. 3 is a ventral view of the fowl in Fig. 2, this view showing a second cut that has been formed in the fowl, the second cut extending on the ventral side of the fowl around the thigh and down to the vent, terminating just above the vent, this view having in dotted line representation cuts on the dorsal side of the fowl;

Fig. 4 is an elevational side view of the fowl illustrating principally the connection between the transverse dorsal cut and the ventral cut shown in Fig. 3;

Fig. 5 is a perspective view showing the first section which includes the dark meat being pulled from the second section held on the shackle;

Fig. 6 is an elevational view showing the separation of the two sections, one having the viscera and dark meat while the other has the light meat;

Fig. 7 is a perspective view showing the removal of edible organs from the viscera;

Fig. 8 is a perspective view showing the next step which is the removal of the viscera from the first section;

Fig. 9 is an elevational dorsal view of the first section after the viscera has been first inspected and then removed;

Fig. 10 is an elevational view of the first and second sections on their shackles and in condition for spray washing and further processing;

Fig. 11 is a perspective view of a shackle which is developed to support the poultry during the eviscerating and processing operations; and Fig. 12 is a perspective view of a special tool which is useful in the removal of the backbone, ribs, etc. from the white meat section as shown in Fig. 5.

Besides the fowl 10 in the accompanying drawings, the method described herein may be practiced on others like it or any fowl susceptible to evisceration and processing in accordance with the invention. It is suggested that certain equipment be used in order to facilitate the practice of the method. This equipment includes an overhead shackle conveyor 12, the latter preferably consisting of an overhead rail 14 on which roller 16 is mounted for movement, the roller having hook 18 carried by it and supporting a shackle 20. This shackle (Fig. 11) consists of a U-shaped body 22 having upwardly opening hooks 24 and 26 at the ends thereof and an eye 28 in its center. Hook 18 is adapted to be passed through the eye 28, and there is a brace 30 extending across the sides of the shackle. Although this is a suggested type of shackle it is understood that a one, two or three hook shackle of other types (unshown) may be substituted.

There is a preliminary bird washer, singer 42 to be used where necessary, the usual self washing drip troughes (unshown) beneath the overhead conveyor, an outside washer and other equipment (unshown) which is optional for the convenience of particular finishing operations. Accessory equipment, as the usual knives, steels, stones, scissors, clippers and saws none of which is illustrated will be available as will be special tool 34 (Fig. 12). It is made of a shank 36 having a handle 38 together with fork 40 at the end of the shank 36 opposite to the end having handle 38. The fork is adapted to be fitted over the upper ribs (Fig. 5) to facilitate separating the two sections of the fowl at the proper part of the procedure.

Fowl 10, typifying any poultry or other foul, is hung on shackle 20 by the wings and under the shoulder points, using every other shackle on the overhead conveyor. It is preferred that the poultry first be New York dressed and either before or after hanging on the overhead conveyor, preferably the latter, the poultry is passed through a singer as schematically represented at 42 in Fig. 1. This removes the vestigial hair from the poultry. Thereafter the oil bag is cut out, using an ordinary poultry knife and a cut 46 (Fig. 2) is made. This consists of a cut on a medial line on the dorsal side of the poultry just below the head and down to the tail. The cut is made completely through the skin but does not penetrate the underlying tissue. The skin is cut around the head. It is important that the cut be skillfully made so as to pass completely through the skin but fail to penetrate the underlying tissue. This importance is emphasized in that the sections (Fig. 10) are separated into light and dark meat along natural muscle and tissue divisions by the application of pulling forces or pressures and not by severing.

After cut 46 is formed the neck skin, esophogus and trachea are peeled down to the crop cavity at approximately 48 (Fig. 2). The crop, trachea and esophogus are peeled loose from the skin. The crop may be completely removed by severing at the entrance to the thoracic cavity.

Thereafter a second cut 50 (Fig. 3) is made on the ventral side of the poultry around the thighs and down to the vent. It is probably more convenient to make cut 50 in two steps, one being around the left thigh and continuing on the ventral side to a point just above the vent and the other being made around the right thigh and continuing to meet the last mentioned cut above the vent. These cuts should also be through the skin only and not into the underlying tissue. Then, the final skin cut 52 is made across the dorsal side of the fowl and connects the ends of the cut 50 and crosses cut 46 (see dotted line arrangement in Fig. 3).

The next step in the process is represented in Fig. 5. With one hand the operator grasps the loose neck 54 and with the tool 34 in the other hand places the prongs 40, one on each side of the neck and down into and behind the ribs in the rib cavity. With both hands the operator gives a slight jerk downward and then a steady pull in the same direction. If no tool 34 is available, the two first fingers of the hand of the operator may be placed around the neck and into the rib cavity. In either case after the force mentioned above is applied, the neck, upper part of the ribs 56, backbone 58, hindquarters 60 and also all of the viscera 62 will completely separate from the second section 66 which consists of the wings, breast, breastbone and back muscles. The first section or portion 59 is hung in the empty shackle 21 next to shackle 20 by the neck and/or upper rib bone. This condition is shown in Fig. 6.

Observe that the carcass can now be inspected with a full view of all of the viscera and inside of the breast without any difficulty because the viscera will be suspended by the backbone. Note that the viscera and the organs connected therewith are in their natural formation and that they are completely separated from the second, white meat containing section 66. After inspection the operator will cut the heart away from the viscera with a pair of scissors (Fig. 7) or some other instrument. In a like manner the liver is cut away from the viscera and the gizzard is likewise removed. Thereafter, that is after all of the edible organs have been cut away from the viscera, an operator may then grasp the rest of the viscera (Fig. 8) which consists of intestines, lungs, sex glands and tear away or cut with a knife or other instrument away from the backbone down to the vent. This condition of the fowl is shown in Fig. 9. The vent is then cut around and offal is dropped away from the carcass without any chance of cutting or tearing the intestines which would contaminate the carcass with fecal material. The next step is the removal of the head and feet by shears, a saw or some other instrument. The lower portion of the rib bones will still be fastened to the keel bone on the inside of the breast. These are peeled out with the fingers or by means of an instrument in order to leave the white meat portion or section clean as shown in Fig. 10. The carcass may now pass through a washer and as all parts are fully exposed this may be done automatically with sprays.

After washing there will remain the two sections 59 and 66, the first section on one shackle having exclusively the dark meat while the other section 66 has exclusively the white meat and is on a separate shackle. From here the process may be varied slightly in accordance with the individual needs or desires. Sections 59 and 66 may be left as they are for making soup stock and for boned meat. As an alternative they may be split and quartered, disjointed for individual pieces or other types of cutting as described herein previously.

In describing the method herein the poultry was first New York dressed. However the process may be performed on poultry which has already been drawn by omitting the steps which pertain to the removal of heads, feet and viscera. Other modifications as fall within the scope of the claims may be resorted to without departing from the invention.

What is claimed as new is as follows:

1. In the process of eviscerating a fowl and forming light and dark meat portions therefrom, the steps of supporting the fowl by both wings under the shoulder points and removing the oil bag, forming a first cut just through the skin on a medial line on the dorsal of the fowl just below the head down to the tail, forming a cut through the skin on the neck near the head, peeling the neck skin, esophogus and trachea down to the crop cavity and then removing the crop, trachea and esophogus from the skin, forming a second cut in the skin of the fowl which is one the ventral side of the fowl around the thighs and down to the vent, forming a third cut in the skin across the back which connects the first and second cuts, pulling the intact backbone and ribs from the remainder of the fowl thereby separating the fowl into a first and second portion, the first portion including the wings, breast and back muscles.

2. In the process of eviscerating a fowl and forming light and dark meat portions therefrom, the steps of supporting the fowl by both wings under the shoulder points and removing the oil bag, forming a first cut just through the skin on a medial line on the dorsal of the fowl just below the head down to the tail, forming a cut through the skin on the neck near the head, peeling the neck skin, esophogus and trachea down to the crop cavity and then removing the crop, trachea and esophogus from the skin, forming a second cut in the skin of the fowl which is on the ventral side of the fowl around the thighs and down to the vent, forming a third cut in the skin across the back which connects the first and second cuts, pulling the intact backbone and ribs from the remainder of the fowl thereby separating the fowl into a first and second portion, the first portion including the wings, breast and back muscles, hanging said portions separate from each other to enable inspection, severing the edible organs from the viscera in said first portion of the fowl, and then separating the viscera from the backbone, removing the vent and dropping the offal away from the carcass.

3. In the process of eviscerating a fowl and forming light and dark meat portions therefrom, the steps of supporting the fowl by both wings under the shoulder points and removing the oil bag, forming a first cut just through the skin on a medial line on the dorsal of the fowl just below the head down to the tail, forming a cut through the skin on the neck near the head, peeling the neck skin, esophogus and trachea down to the crop cavity and then removing the crop, trachea and esophogus from the skin, forming a second cut in the skin of the fowl which is on the ventral side of the fowl around the thighs and down to the vent, forming a third cut in the skin across the back which connects the first and second cuts, pulling the neck, backbone and the ribs intact from the remainder of the fowl thereby separating the fowl into a first and second portion, the first portion including the wings, breast and back muscles, hanging said portions separate from each other to enable inspection, severing the edible organs from the viscera in said first portion of the fowl, and then separating the viscera from the backbone, removing the vent and dropping the offal away from the carcass, and removing the head, feet and lower part of the rib bones.

4. The method of eviscerating a fowl and separating it into a first white and a second dark meat portion by the application of pressure and tension to accomplish the separation of white and dark meats by actual muscle separation and bone disarticulation and including supporting the fowl, and removing the oil bag, cutting through the skin only along a medial line on the dorsal from below the head to the tail, peeling the skin down to the crop and removing the exposed organs and the crop, forming a second cut in the skin only around the thighs and on the ventral side of the fowl to a place slightly above the vent, continuing the second cut across the back, applying a tensile force on the upper part of the ribs and neck in a direction to separate the first portion from the second portion with the viscera completely separated from said second portion, separating edible organs from the viscera and removing the viscera from the first portion.

5. The method of eviscerating a fowl and separating it into a fist white and a second dark meat portion by the application of pressure and tension to accomplish the separation of white and dark meats by actual muscle separation and bone disarticulation, the method consisting essentially in the steps of supporting the fowl, removing the oil bag, cutting through the skin only along a medial line on the dorsal from below the head to the tail, peeling the skin down to the crop and removing the exposed organs and the crop, forming a second cut in the skin only around the thighs and on the ventral side of the fowl to a place slightly above the vent, continuing the second cut across the back, applying a tensile force on the upper part of the ribs and neck in a direction to separate the first portion from the second portion with the viscera completely separated from said second portion, separating edible organs from the viscera and removing the viscera from the first portion, and removing the vent, feet, head and lower part of the rib bones from the first portion.

6. In the method of processing poultry, the steps of forming a cut along a medial line from the region of the head down the neck and the dorsal side of the bird to the tail, forming this cut in the skin only and leaving the underlying tissue intact, forming a second cut around the thighs and along the ventral side of the poultry extending slightly above the vent, forming a final cut across the dorsal side of the bird and crossing the first mentioned cut and joining as a continuation of the ends of the second cut, pulling the neck and ribs to separate the upper part of the ribs, backbone and hindquarters from the remaining section of the poultry, the remaining section including wings, breast and back muscles thereby separating along natural lines of cleavage the light meat from the dark meat, the light meat being in a section separate from the remaining section which has the dark meat.

7. The method of claim 6 wherein the poultry is first suspended from a point beneath the wings and propelled while in the suspended position to new stations in performing the various said steps.

8. The method of eviscerating and processing poultry comprising the steps of first New York dressing the poultry and then suspending it from beneath the wings with the tail end of the poultry down, removing the oil bag, forming a first cut solely through the skin and on a medial line on the dorsal side of the poultry just below the head and down through the tail, forming a second cut solely through the skin on the neck near the head and peeling the neck skin, esophogus, trachea down to the crop cavity, then removing the crop, trachea and esophogus from the skin, forming another cut in the skin which is on the ventral side of the poultry around the thighs and down to the vent, forming a further cut in the skin across the back which connects the ventral and dorsal cuts, pulling the neck and ribs from the remainder of the poultry and thereby separating it into two connected sections with further pulling completely separating the sections, suspending the separated section alongside of the other section which has the wings, breast and back muscles, removing the edible organs from the viscera which remains with the first section and then removing the viscera and cutting away the head, feet and vent, and then removing the lower portion of the rib bones which still adheres to the keelbone on the inside of the breast.

9. The process of separating a fowl into light and dark meat portions comprising the steps of forming a first cut through the skin only of the fowl along a longitudinal line on the dorsal side of the fowl, forming a second cut through only the skin on the ventral side of the fowl and extending around the thighs and down to a point above the vent, the second cut extending around the fowl and crossing the first cut intermediate the ends of the first cut, applying a force which is directed to separate the fowl along natural lines of division between light and dark meat to thereby divide the fowl into a light and a dark meat section.

10. The process of separating a fowl into light and dark meat portions comprising the steps of forming a first cut through the skin only of the fowl along a longitudinal line on the dorsal side of the fowl, forming a second cut through only the skin on the ventral side of the fowl and extending around the thighs and down to a point above the vent, the second cut extending around the fowl and crossing the first cut intermediate the ends of the first cut, applying a force which is directed to separate the fowl along natural lines of division between light and dark meat to thereby divide the fowl into a light and a dark meat section, and hanging the sections individually for inspection of the viscera which remains attached to one section by the natural membranes.

11. The process of separating a fowl into light and dark meat portions comprising the steps of forming a first cut through the skin only of the fowl along a longitudinal line on the dorsal side of the fowl, forming a second cut through only the skin on the ventral side of the fowl and extending around the thighs and down to a point above the vent, the second cut extending around the fowl and crossing the first cut intermediate the ends of the first cut, applying a force which is directed to separate the fowl along natural lines of division between light and dark meat to thereby divide the fowl into a light and a dark meat section with the ribs and backbone intact with the dark meat section, hanging the sections individually for inspection of the viscera which remains attached to one section by the natural membranes, separating the edible organs from the viscera while the sections remain hanging, and then separating the viscera from the section to which it is attached.

References Cited in the file of this patent
UNITED STATES PATENTS

| | | |
|---|---|---|
| 1,433,628 | Knaust | Oct. 31, 1922 |
| 2,243,951 | Gehlke | June 3, 1941 |